(12) United States Patent
Diaz et al.

(10) Patent No.: US 7,606,660 B2
(45) Date of Patent: Oct. 20, 2009

(54) IN-VEHICLE NAVIGATION SYSTEM WITH REMOVABLE NAVIGATION UNIT

(75) Inventors: Melvin Bernard Diaz, La Palma, CA (US); Tsutomu Tommy Ogawa, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 297 days.

(21) Appl. No.: 11/642,414

(22) Filed: Dec. 20, 2006

(65) Prior Publication Data

US 2007/0203641 A1 Aug. 30, 2007

Related U.S. Application Data

(60) Provisional application No. 60/755,484, filed on Dec. 31, 2005.

(51) Int. Cl.
*G01C 21/30* (2006.01)
(52) U.S. Cl. .................. 701/208; 701/211; 701/213
(58) Field of Classification Search ......... 701/200–214; 342/357.06–357.13; 340/988–995
See application file for complete search history.

(56) References Cited

U.S. PATENT DOCUMENTS 6,681,176 B2 * 1/2004 Funk et al. .................. 701/207
7,295,921 B2 * 11/2007 Spencer et al. .............. 701/208
7,444,238 B1 * 10/2008 Opitz ......................... 701/208

FOREIGN PATENT DOCUMENTS

JP 07-143419 6/1995

* cited by examiner

*Primary Examiner*—Richard M. Camby
(74) *Attorney, Agent, or Firm*—Muramatsu & Associates

(57) ABSTRACT

A navigation system includes an in-vehicle portion and a removable navigational unit, where the removable navigation unit is a portable device with navigation capability on its own. The removable navigation unit is capable of being connected to the in-vehicle portion through an navigation interface to perform the navigation function in combination with the in-vehicle portion. The removable navigation unit seamlessly integrates with the in-vehicle portion of the vehicle to provide portability of navigation function when used independently from the in-vehicle portion, and taking advantage of the components of in-vehicle portion when used in conjunction with the in-vehicle portion.

17 Claims, 15 Drawing Sheets

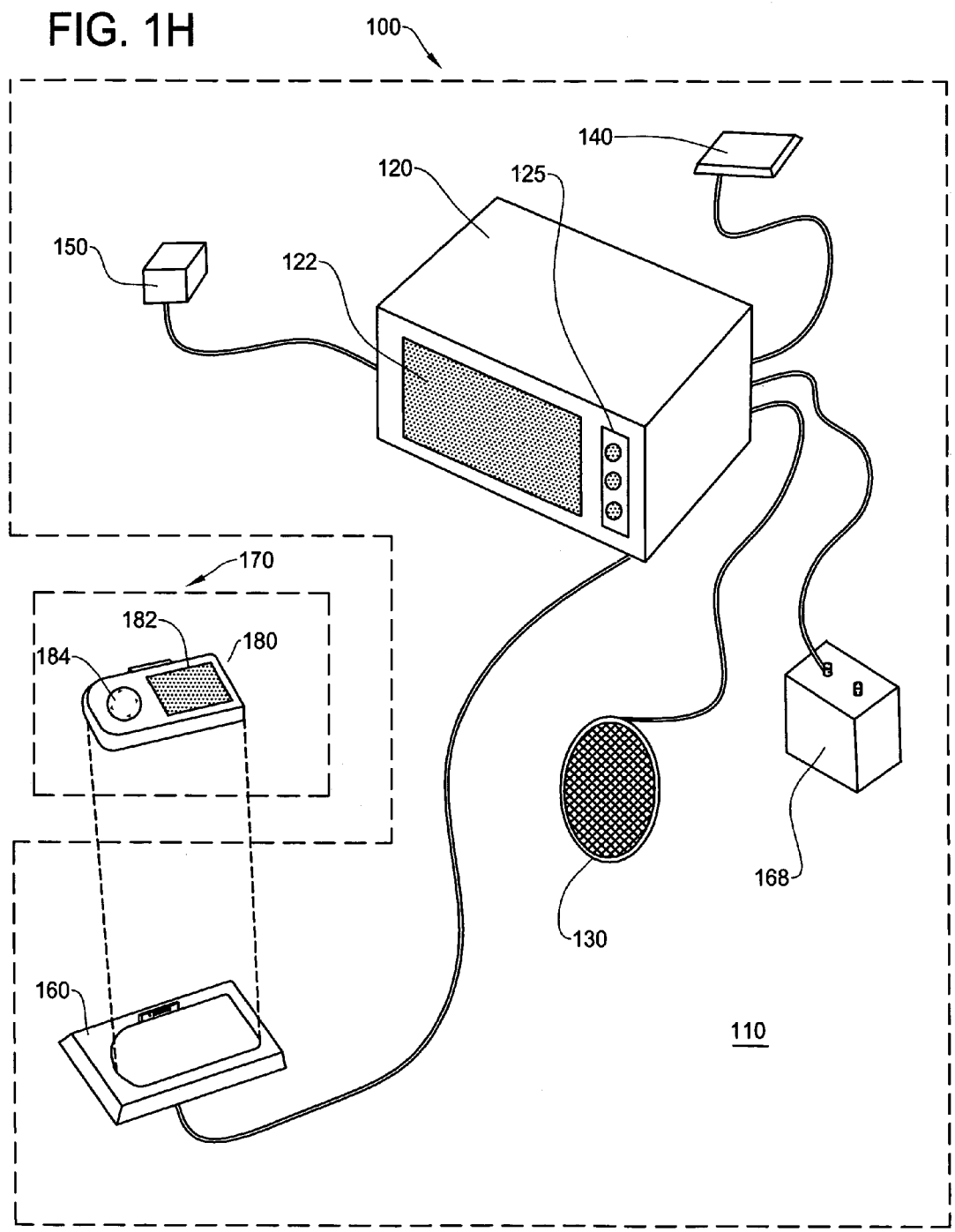

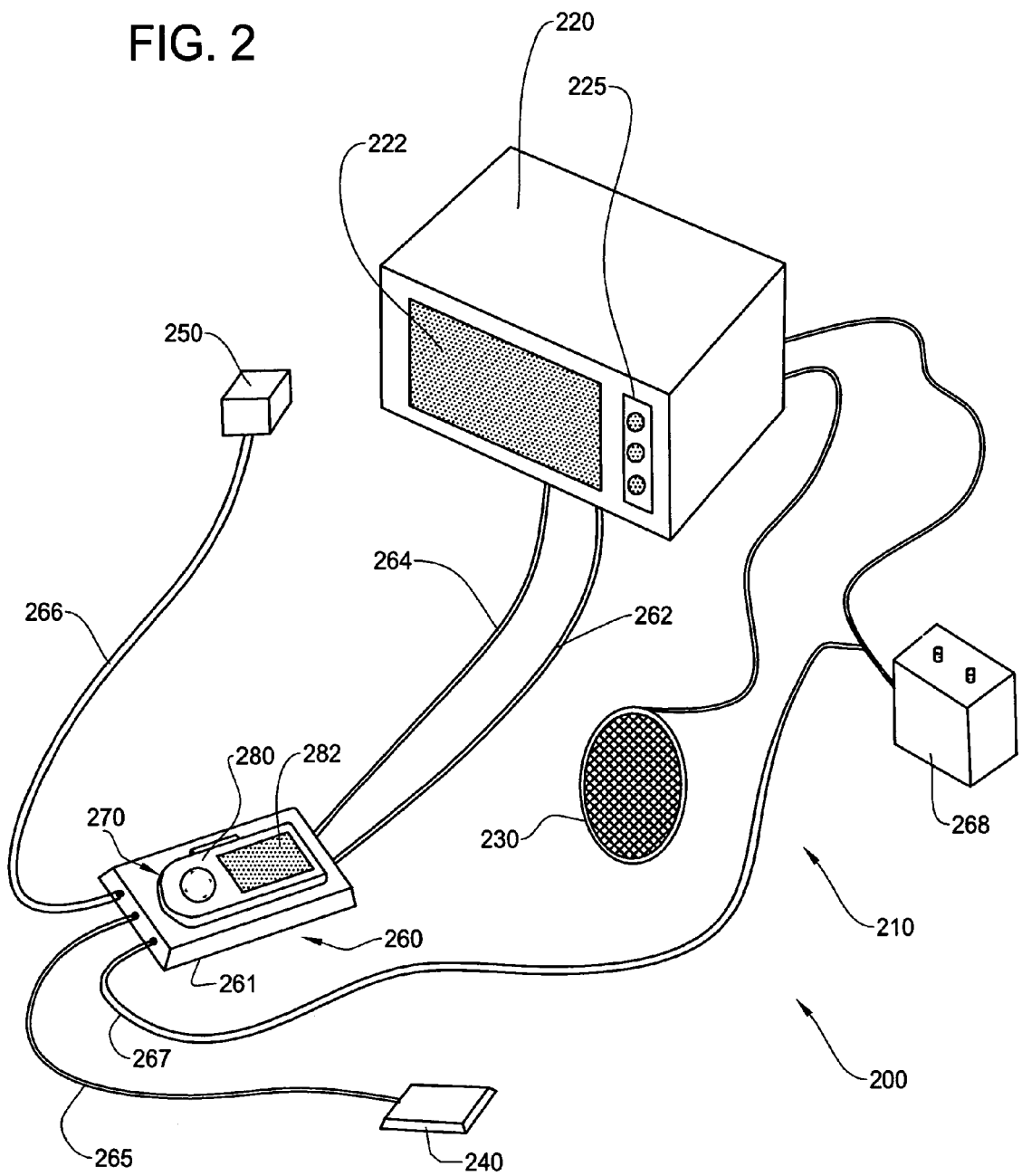

FIG. 4

| Pin No. | Pin Name | Use | I/O | Specification | Notes |
|---|---|---|---|---|---|
| 1 | Audio GND | Ground for Audio | - | GND Level. | |
| 2 | Video GND | Ground for Video | - | GND Level. | |
| 3 | Audio (Mono) | Outputs Voice Guidance | O | 800*100 [mVrms] | Buzzer output 85±10mVrms |
| 4 | Guide Control | This port changes to Hi level when a voice guidance prompt is announced. | O | Hi: 5V/ Low: 0V | Those for Europe are inverse logic. |
| 5 | Video (NTSC) | Outputs video signal (NTSC). | O | 2.0±0.2 [Vp-p] | It is 1.0Vp-p when carrying out a terminus by 75Ω. |
| 6 | Remote | Receives remote controller's signal from Alpine display. | I | Low level detect: 2V/1mA | |
| 7 | Disp. Cont. | Hi level is outputted in order to tell having connected with Navi to Alpine display. When having connected with a touch panel display, it is used as a TX port for touch panels. | O | Hi: 5V/ Low: 0V | Those for all areas are same logic. |
| 8 | R | Red signal. | O | 0.7±0.2 [Vp-p] | Terminus: 75Ω |
| 9 | B | Blue signal. | O | 0.7±0.2[Vp^] | Terminus: 75Ω |
| 10 | NTSC / RGB | When outputs RGB signal, outputs HI level. | O | Hi: 5V/ Low: 0V | For navi mpage output judgment. |
| 11 | WIDE / NORMAL | Receives display's aspect ration, If display's aspect ratio is 16:9, receives Hi Level. If it is 4:3, receives Low Level. When having connected with a touch-panel display, it is used as a RX port for touch panels. | I | Hi: 5V/ Low: 0V | |
| 12 | C. Sync. | Negative logic synchronization signal. | O | Hi: 5V/ Low: 0V | |
| 13 | G | Green signal. | O | 0.7±0.2 [Vp-p] | Terminus: 75Ω |

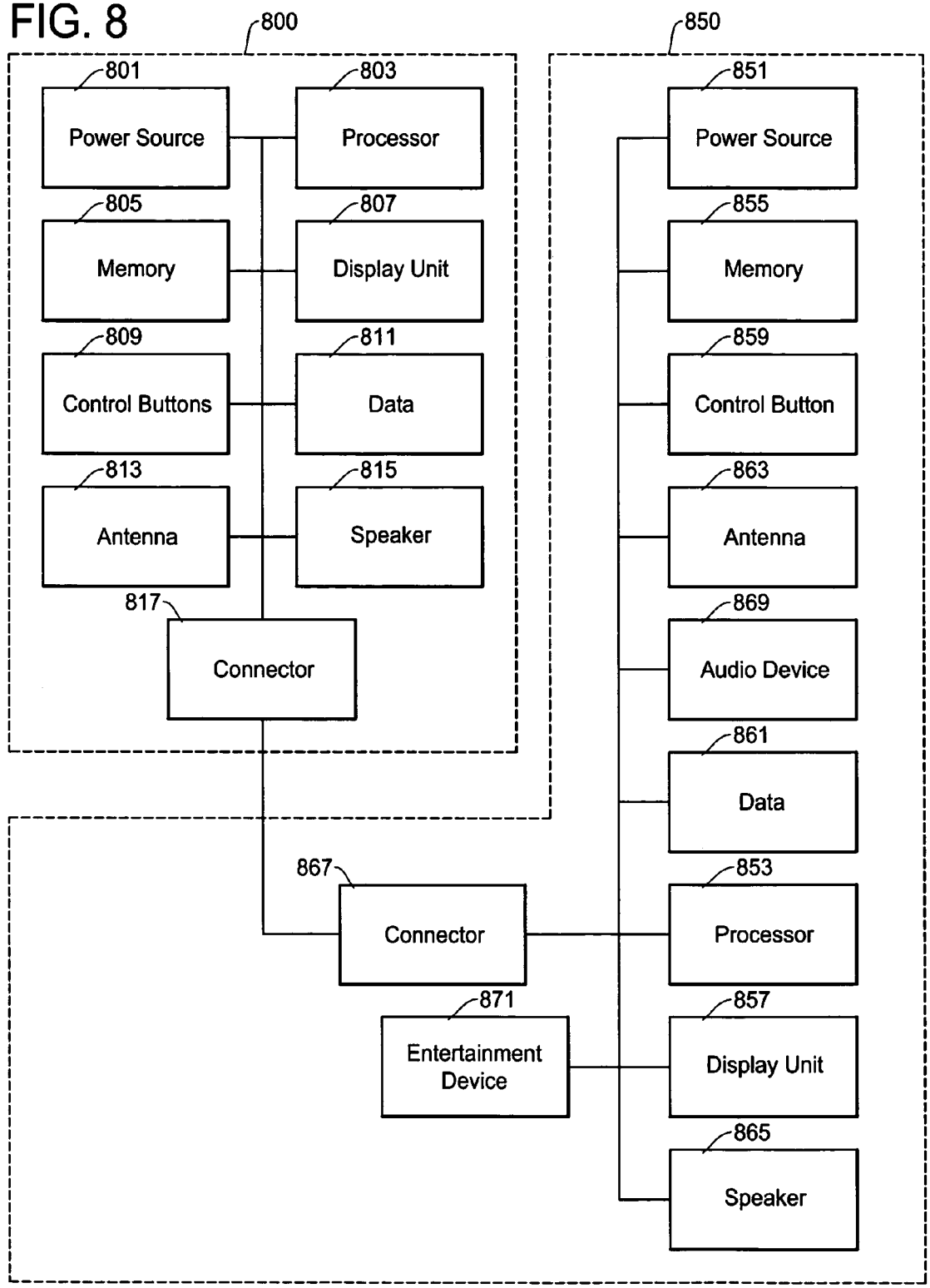

IN-VEHICLE NAVIGATION SYSTEM WITH REMOVABLE NAVIGATION UNIT

This application claims the benefit of U.S. Provisional Application No. 60/755,484 filed Dec. 31, 2005.

FIELD OF THE INVENTION

This invention relates generally to an in-vehicle navigation system with a removable navigation unit, and more particularly, to a removable navigation unit that seamlessly integrates with an external device generally mounted in a vehicle to provide portability of navigation function when used independently from the external device, and taking advantage of the components of the external device when used in conjunction with the external device.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. In recent years, the use of both mobile media and navigation systems in a vehicle has become increasingly more common. Because of data storage requirements, such systems were initially somewhat bulky and required that the systems be permanently installed in the vehicle. However, more recently developed devices are sufficiently compact to allow them to be personally portable and be temporarily mounted within the vehicle. This gives the user the option to use the device both inside and outside of the vehicle.

To have the navigation display visible to the driver when such devices are used within a vehicle, the portable device is either, held by the driver or a passenger, propped up against the interior structure of the vehicle, or otherwise attached to a device mount. Such a device mount typically is further secured to a portion of the interior of the vehicle at a position such that the display is visible by the driver. An example of the attachment of such a device mount to the interior of the vehicle is via a suction cup portion to the front windshield.

To increase the portability of such navigation devices it is desirable to reduce or minimize the overall physical size of the device as much as possible. Of course, the reduction of the overall size of such navigation devices has resulted in a similar reduction in the size of the device components, including the display and the controls. While being used as a portable device, the smaller display and controls tend not to be a problem for the user as the portable device is held relatively close and the user can concentrate primarily on the operation and display of the navigation device.

However, when such a portable navigation device is mounted in a vehicle, the smaller display and controls present certain problems for the driver. One such problems includes being difficult to read or otherwise observe the information on the small display of the portable device, especially given that the driver's primary attention and concentration needs to be directed towards the operation of the vehicle and the road ahead, and not on the navigation display. This problem is compounded by the fact that when attached to a device mount, the navigation device is typically held much further away from the user than if it was held in hand in a portable mode.

Another problem of in-vehicle use is that the controls such as keys and touch panel of the portable navigation device are also positioned relatively far away and are small in size. Yet another problem is that the sounds generated by the portable navigation device, such as directional call-outs, street names and the like, may not be heard by the driver especially due to the distant positioning of the navigation device and the effect of other sources of sound, such as the car audio system.

A portable navigation device may be used in a vehicle in conjunction with an external (second) display device such as a head unit of the vehicle audio/video system. The external display device in general has a larger display size compared to the display size of the portable navigation device. Moreover, the external display device may also be positioned in such a way that the user is able to reach and read or observe the information on the display with ease. Thus, it would be advantageous to connect the portable navigation device to the external display.

Therefore, a need exists for a navigation system which includes a removable navigational unit, which while used in the vehicle, provides an improved operation of the navigation system within the vehicle.

SUMMARY OF THE INVENTION

It is, therefore, an object of the present invention to provide a navigation system comprised mainly of a removable navigation unit which acts as a portable GPS, and an external device (in-vehicle portion) that is typically mounted on a vehicle where the removable navigation unit and the external device can be connected with each other.

In at least one embodiment, the present invention is a navigation system which includes a portable navigation unit, a display screen, controls, at least one speaker, a GPS antenna and a vehicle data generator. The portable navigation unit is removable or otherwise detachable from the navigation device and when detached, it can be operated on its own using a built-in display, controls, speaker and GPS antenna. When the portable navigation unit is attached to the remaining or fixed portions of the navigation device, then the portable navigation unit operates with these components as a complete navigation system.

Specifically, when attached to the remainder of the system the portable navigation unit switches its display from its integral display to the in-vehicle display screen, its control inputs to the in-vehicle controls, its sound generation to the in-vehicle speakers, and its GPS signal input to the in-vehicle GPS antenna. In addition, the portable navigation unit can add an input from the vehicle data generator to further facilitate the generation of navigation data.

When used with the in-vehicle components of the navigation system, the in-vehicle functions of the portable navigation system may be improved. Namely, the portable navigation unit may be made easier to use and function better in a vehicle, since the in-vehicle display screen can be larger than that of the integral screen, the controls (keys, touch screen, etc.) may be bigger and better positioned for the user, the sound can be louder, clearer and easier to control, the GPS signal reception may be improved and the accuracy of the navigation can also be increased.

BRIEF DESCRIPTION OF THE DRAWINGS

FIG. 1H is a perspective view showing an overall structure of the navigation system in accordance with at least one embodiment of the present invention where the portable navigation unit and the in-vehicle components are illustrated separately.

FIG. 2 is a perspective view showing another example of overall structure of the navigation system established by the portable navigation unit and the in-vehicle components in accordance with at least one embodiment of the present invention.

FIG. 4 is a table showing an example of pin assignment for the navigation system in accordance with at least one embodiment of the present invention.

FIG. 8 is a schematic block diagram showing an example of components and connection among the components for forming the navigation system of the present invention.

DETAILED DESCRIPTION OF THE PREFERRED EMBODIMENT

In at least one embodiment, the present invention includes a navigation system having both of a portion that is mounted in a vehicle (in-vehicle portion) and a portion that is removable and/or portable (portable navigation unit). The removable portion, i.e, the portable navigation unit, is capable of operating on its own, and separate from the remaining in-vehicle components of the navigation system.

Further, depending on the embodiment, the in-vehicle portion of the navigation system may be capable of operating and performing certain functions on its own separately from the removable portion (portable navigation unit). However, with the removable portion of the system received by and operating with the in-vehicle portion, each portion is capable of operating with additional functionality. Typically, the portable navigation unit has not only a navigation function but other functions, such as a digital audio player, an FM transceiver, etc., as well.

Figure 1A:
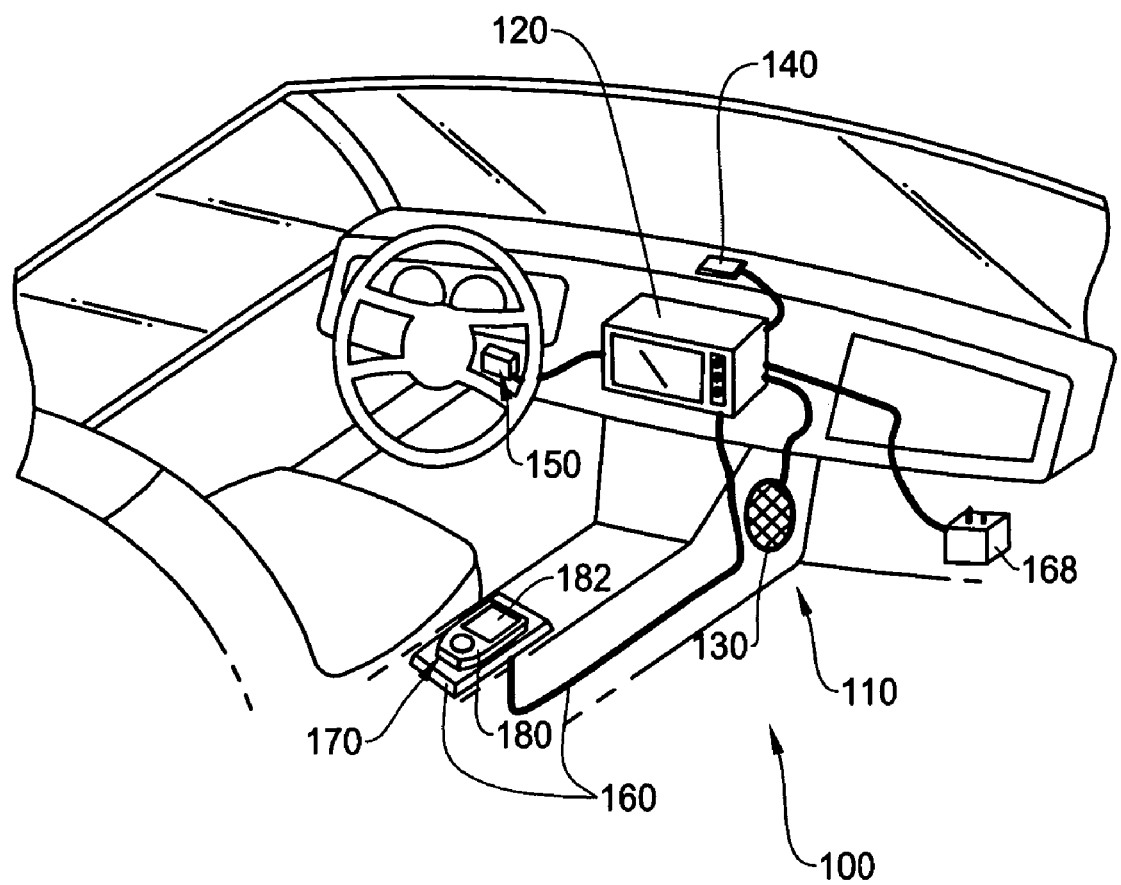
FIG. 1A is a perspective view showing a vehicle interior which includes a navigation system established by a portable navigation unit and in-vehicle components in accordance with at least one embodiment of the present invention.
Figure 1B:
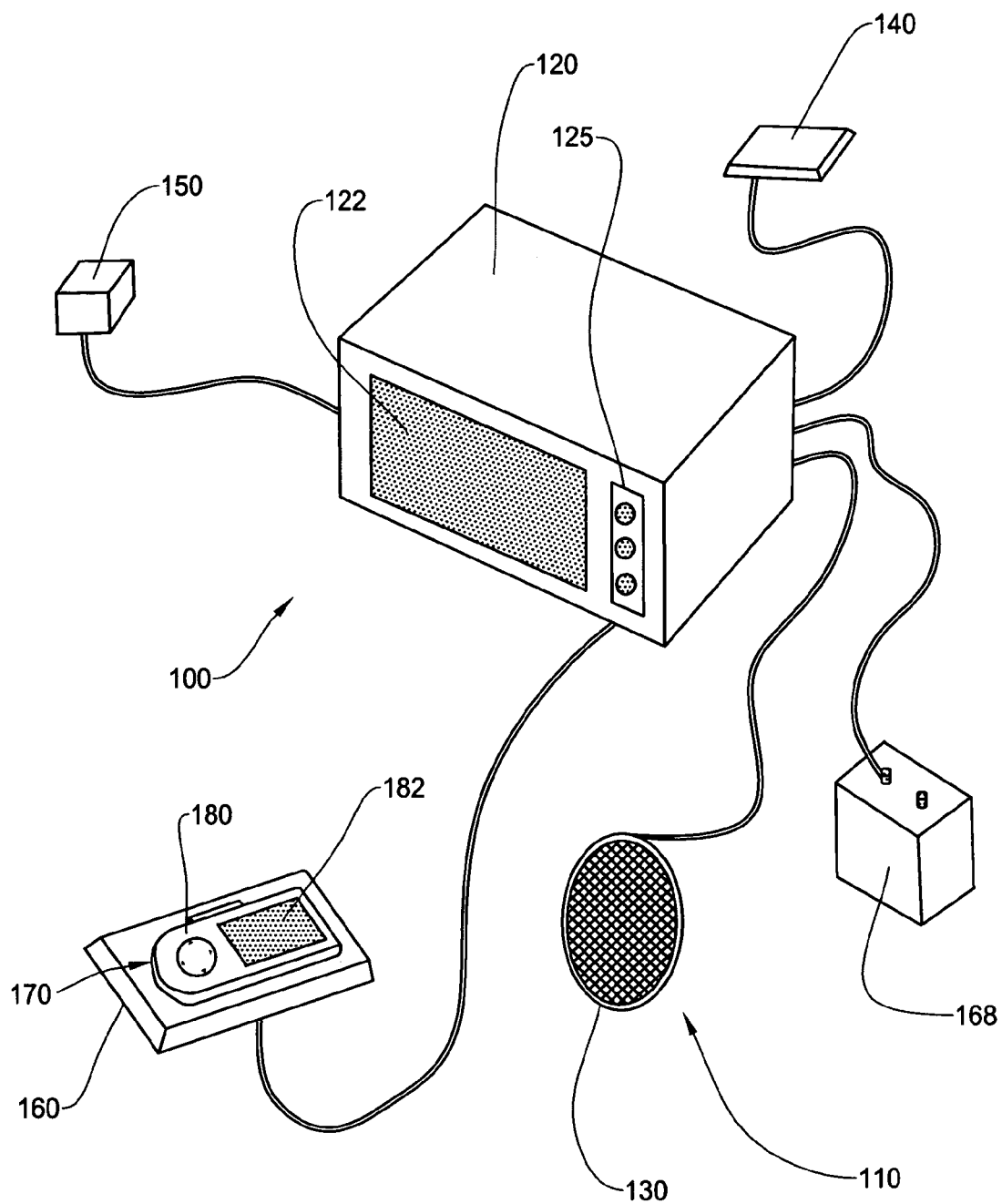
FIG. 1B is a perspective view showing an example of overall structure of the navigation system established by the portable navigation unit and the in-vehicle components in accordance with at least one embodiment of the present invention.

One embodiment is shown in FIGS. 1A and 1B, the navigation system 100 includes an in-vehicle portion 110 (also referred to as "in-vehicle components") and a removable or portable portion 170 (also referred to as a "portable navigation unit"). FIG. 1A shows the embodiment example of the condition wherein the navigation system 100 is installed to a vehicle. Actual placement, shape and size of parts of the navigation system 100 in the vehicle may differ from the view in FIG. 1A when the navigation system 100 is actually applied to a vehicle.

FIG. 1B is a perspective view showing an example of overall structure of the navigation system established by the portable navigation unit and the in-vehicle components in accordance with at least one embodiment of the present invention. In this example, the navigation system 100 is separated from the vehicle to clearly show the overall components associated with the system. The in-vehicle portion 110 includes an in-vehicle display 120 which is typically a head unit of a vehicle audio/video system, speaker or speakers 130, a GPS (navigation) antenna 140, a vehicle data generator 150, a navigation interface 160 and a vehicle power source (battery) 168. The removal portion 170 includes a portable navigation unit 180.

With the navigation system 100, the user can either use the portable navigation unit 180 within the vehicle or away from the vehicle as a portable device (hand-held navigation device, digital audio player, etc). As shown in FIGS. 1E and 1F, the portable navigation unit 180 includes integral components including an interface or connector 181 for electrical connection with a device mount or cradle (not shown), a display 182, controls 184 such as keys and buttons, a speaker 185, a GPS or navigation antenna 186, and a power source (battery) 188. The portable navigation unit 180 has a self-contained operation such that the user can carry and use the unit separately and independently from the rest of the navigation system 100 and the vehicle in which the in-vehicle portion 110 is contained.

The portable navigation unit 180 can be connected to the in-vehicle portion 110 of the navigation system 100 by any of a variety of means. This connection between the portable navigation unit 180 and the in-vehicle portion 110 enables transmitting signals therebetween for communication. These signals can include data such as navigation images, call-outs transmitted from the portable navigation unit 180 to the in-vehicle portion 110 and GPS signals, vehicle information (e.g. speed pulses), control inputs, transmitted from the in-vehicle portion 110 to the portable navigation unit 180.

In some embodiments, the connection includes direct electrical communication between the portable navigation unit 180 and the in-vehicle portion 110. The direct communication can include two or more electrical connectors or pads in direct physical contact, allowing an electrical connection to be established. In the embodiment of FIGS. 1E and 1F, the direct electrical connection to the portable navigation unit 180 can be established through an interface (electrical connector) 181. The interface 181 can be any of a variety of different configurations, including a plug or receptacle, with the in-vehicle portion 110 having a matching cooperating plug or receptacle in the navigation interface 160.

In some embodiments, the connection between the portable navigation unit 180 and the in-vehicle portion 110 is made by means other than a direct electrical connection. For example, the connection can be by wireless means, such as a WiFi, Bluetooth, FM transmission, or the like. Such a wireless communication allows the portable navigation unit 180 to operate with the in-vehicle portion 110 without the need of directly connecting the portable navigation unit 180 to the in-vehicle portion 110, which in turn allow for easier use and less exposed wires in the vehicle.

In some embodiments, the display 182 functions to display the navigational data and information when the portable navigation unit 180 is used in its portable mode of operations. The navigational data can show or display images 183 such as maps, symbols, turn indicators, routes, points of interests or POIs, various icons, and the like. The display 182 can be any of a variety of commercially available display screens including a color LCD device, plasma display device, etc. Many other displays, commercially available or not, can also be used for the display 182.

As the portable navigation unit 180 is connected to, or otherwise in communication with the in-vehicle portion 110 of the navigation system 100, in the embodiments, the portable navigation unit 180 is placed into a mode where the display 182 is turned off. In this mode, the associated data is transmitted to the in-vehicle portion 110 so that the image 183 is reproduced on the in-vehicle display screen 120, as shown in FIGS. 1A and 1B. In this manner, the display 182 can be off when it is not required to show navigation data on the portable navigation unit 180.

In other embodiments of the present invention, the display 182 continues to remain on when the portable navigation unit 180 is connected to the in-vehicle portion 110 of the navigation system 100. Such embodiments may be used to allow other occupants of the vehicle to be able to view the navigation data on the portable navigation unit 180. One example of such an embodiment would include positioning the portable navigation unit 180 connected to the in-vehicle portion so that the rear seat passengers can see the image 183 on the display 182. As noted below with respect to certain embodiments, the display 182 may be a touch screen which has the capability to incorporate some or all of the controls 184.

In the embodiment shown in FIGS. 1E and 1F, the controls 184 are set on the exterior of the portable navigation unit 180 and are generally adjacent to the display 182. The controls 184 allow the user to operate the various functions of the portable navigation unit 180, such as moving through menu screen and selecting items or operations. The specific size, shape, location and operation of the controls 184 can vary depending on the particular embodiment.

As noted above, in some embodiments, some or all of the controls 184 are integrated into the display 182. This integration can be performed by any of a variety of means including using a touch screen for the display 182 with a displayed image which shows a button, switch, slider or other representation of control. This allows the controls integrated to be changed and tailored to the particular condition and operation of the portable navigation unit 180.

Figure 1C:
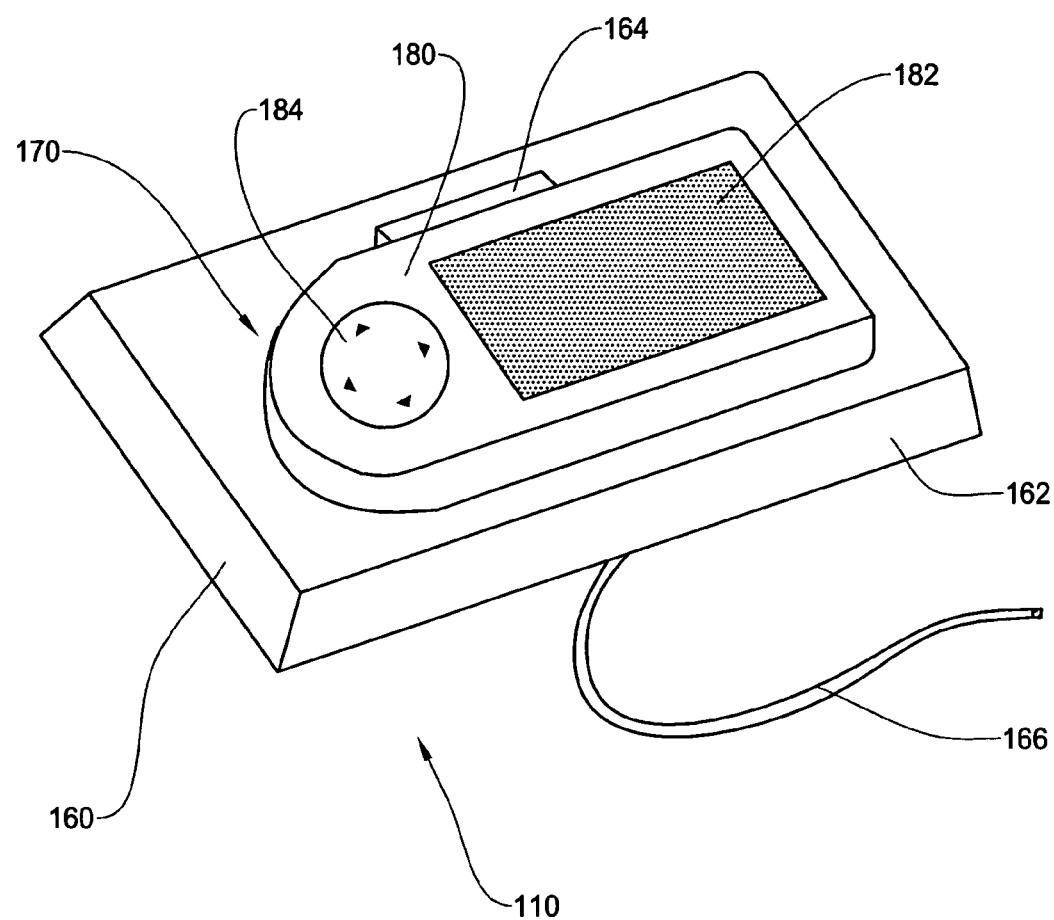
FIG. 1C is a perspective view of a portion of a navigation system including the portable navigation unit and a navigation interface in accordance with at least one embodiment of the present invention.

In some embodiments, the operation of some or all of the controls 184 are disabled when the portable navigation unit 180 is connected to the in-vehicle portion 110 as shown in FIGS. 1A-1C. In this configuration, the portable navigation unit 180 is capable of being controlled by in-vehicle controls incorporated in the in-vehicle portion 110 as further described herein. An example of such in-vehicle controls can include the in-vehicle display 120 having a touch sensitive screen which shows various keys and menu bars and transmits control inputs through the interface 160 to the portable navigation unit 180.

Disabling the controls 184 can protect the operation of the navigation system 100 from an accidental or stray control input being entered directly into the portable navigation unit 180. This aspect can be beneficial if the portable navigation unit 180, when connected to the in-vehicle portion 110, is positioned such that it is easily and/or unintentionally bumped or otherwise contacted by the occupants of the vehicle.

In other embodiments, the operation of some or all of the controls 184 are kept active when the portable navigation unit 180 is connected to the in-vehicle portion 110. This arrangement may be useful to allow a remote vehicle occupant (e.g. the rear seat passenger) to separately operate the navigation system 100.

As shown in FIG. 1F, the speaker 185 can be used to transmit audio information related to the navigation operations of the portable navigation unit 180. This audio information can include call outs for turns, street names, POIs, arrival indications, and the like. The audio information may also include music, songs, dramas, news, etc., when the portable navigation unit 180 is used as a digital audio player or an FM receiver. The use of audio in addition to a visual display can greatly aid the driver and minimize driver distraction.

As shown in FIGS. 1A, 1B and 1F, in some embodiments, when the portable navigation unit 180 is connected to the in-vehicle portion 110, the speaker 185 can be turned off and the sound is sent via the interface 160 to the in-vehicle speakers 130. The use of the larger and sometime higher quality in-vehicle speakers 130 instead of the smaller integral speaker 185, can provide a better and clearer audio presentation for the user.

An additional benefit of using the in-vehicle speakers 130 is that, in some embodiments, the in-vehicle portion 110 of the navigation system 100 can automatically mute or lower the volume of other media being played over the in-vehicle portion 110 (non-essential sound) when a call out or other announcement is made by the navigation system 100. In this way, the user will not miss or not hear a call out by the navigation system 100 while the in-vehicle portion 110 is broadcasting other media (e.g. playing a song).

As shown in FIGS. 1E and 1F, the navigation antenna 186 functions to receive navigation signals transmitted from an external source or sources, such as orbiting satellites. In certain embodiments, the navigation signals received by the navigation antenna 186 are GPS signals and the antenna is a GPS antenna. In other embodiments, the signals received by the navigation antenna 186 also include other information such as traffic reports, weather conditions and the like.

The navigation antenna 186 shown in FIG. 1F is in a closed position where the antenna is folded down while the navigation antenna 186 shown in FIG. 1E is in an open position where the antenna is oriented in a horizontal direction. The navigation antenna 186' shown in the dotted lines of FIG. 1F indicates the antenna in the open position like the antenna 186 shown in FIG. 1E.

When the portable navigation unit 180 is used separately from the in-vehicle portion 110 in a portable mode, the navigation antenna 186 is capable of receiving navigation (GPS) signals. Based on the GPS signals, the portable navigation unit 180 is able to determine the current position of the user as well as other navigation related information (speed, compass heading, etc.). The portable navigation unit 180 is also able to reproduce music or other audible sounds when used as a digital audio player or an FM receiver.

With the portable navigation unit 180 connected to the in-vehicle portion 110, in some embodiments, the integral GPS antenna 186 is no longer used and instead the navigation signals are received by the portable navigation unit 180 via the in-vehicle portion 110. Specifically, as shown in FIGS. 1A and 1B, the navigation signals can be received from the in-vehicle antenna 140 when the portable navigation unit 180 is connected to the in-vehicle portion 110. The navigation signal reception can be greatly improved by using the vehicle mounted antenna 140 instead of the integral antenna 186 because typically the in-vehicle antenna 140 can be formed larger in size using superior components than that of the integral antenna 186.

Another reason is that although metal and other components of the vehicle can block, interfere or otherwise degrade the navigation signal reception within the vehicle, the in-vehicle antenna 140 can be mounted in a location on the vehicle where this degradation is minimized or non-existent. For example, the in-vehicle antenna 140 can be mounted under the front or rear windshields, or even on the outside of the vehicle on the roof or the trunk. In contrast, for convenience and ease of use, the portable navigation unit 180 will typically be mounted within the interior structure of the vehicle, which can adversely affect its ability to receive the navigation signal.

Other embodiments of the navigation system 100 may use the integral navigation antenna 186 to receive the GPS signals even when the portable navigation unit 180 is connected to the in-vehicle portion 110. Thus, in such embodiments, the in-vehicle antenna 140 can be omitted. This may be done to reduce an overall cost and/or complexity of the navigation system 100.

The power source 188 functions to provide electric power to operate the portable navigation unit 180 separately from any external power source. Depending on the embodiment, the power source 188 can be any of a variety of available batteries or the like. For example the power source 188 can be one or more rechargeable batteries. In some embodiments, when the portable navigation unit 180 is connected to the in-vehicle portion 110, such as that shown in FIGS. 1A, 1B and 1C, the power source 188 is recharged by the vehicle through the interface 140.

As shown in FIGS. 1A and 1B, and as noted above, the in-vehicle portion 110 of the navigation system 100 includes the in-vehicle display 120, the controls 125, the speaker 130, the navigation antenna 140, the vehicle data generator 150, the device interface 160 and the vehicle power source 168. Different embodiments will contain different variations of the above listed items in the particular in-vehicle portion of the navigation system. For example, in some embodiments, only the display 120 is included in the in-vehicle portion 110. In this manner, the user is provided with a larger fixed screen to view the navigation information, but all other operations and functions occur at or within the portable navigation unit 180. In other embodiments, a wireless device interface 160 is provided to transmit a signal to a set of speakers 130 and none of the other components listed above are included.

While the in-vehicle portion 110 of the system can function with the portable navigation unit 180, as noted above, in embodiments, it may also function on its own and separately from the portable navigation unit 180. In this regard, as shown in FIG. 1G, the in-vehicle portion 110 may also include a media or information source 190 which is capable of providing images and/or audio data to the display 120 and the speakers 130, respectfully. This allows the in-vehicle portion 110 to be operated independently of any connection to the portable navigation unit 180.

One example of the media (information) source 190 can be an FM radio which receives traffic incident information, weather forecast, sports and other event information, etc. Another example of the information source 190 can be a trip computer which uses input from the vehicle data generator 150 to calculate trip and status information of a vehicle and present it on the display 120. Many other such configurations of the in-vehicle portion 110 are possible.

Some embodiments of the navigation system 100 may also include a microphone for voice commands. The microphones may be included in either the portable portion 170 or the in-vehicle portion 110. When the portable navigation unit 180 is connected to the in-vehicle portion 110, then either of a microphone on the portable navigation unit 180 or in the in-vehicle portion 110, or the both microphones can be used. The advantages of using an in-vehicle microphone can include an improved quality and an improved sensitivity for a directional microphone to pick up user's voice command.

As shown in FIGS. 1A and 1B, the in-vehicle display 120 can, in embodiments, be a mounted or in-dash display which is positioned to be viewable by the driver. The in-vehicle display 120 can be a flat panel LCD display, a plasma display, a projection display, a CRT, or any other similar such display. While the specific size and shape of the display 120 can vary, to aid the driver in operating the vehicle and to reduce driver distraction, the display 120 is typically significantly larger than the display 182 of the portable navigation unit 180.

Such a larger display allows the driver to obtain more navigational information quickly in an efficient manner than is possible with a smaller display, especially if the smaller display is positioned further away from the driver. In some embodiments, the in-vehicle display 120 also incorporates some or all of the controls 125 through its touch screen as further described below. The display 120 can project an image 122 which can be generated either by an in-vehicle device such as the media (information) source 190 or by the portable navigation unit 180 connected thereto.

In embodiments where the aspect ratio of the in-vehicle display 120 and that of the display 182 of the portable navigation unit 180 differ, either the in-vehicle portion 110 and/or the portable portion 170 may also include a display generator (not shown). Such a display generator can sense or otherwise determine the difference in the aspect ratios and then automatically adjust the image to properly fit the image to the display to which it is projected. In some embodiments only certain elements of the image are resized and/or reshaped for projection on the display having a different aspect ratio. Limiting the reconfiguration of the image to specific elements allows for a reduced use of processing power and thus a quicker image rendering.

Figure 3:
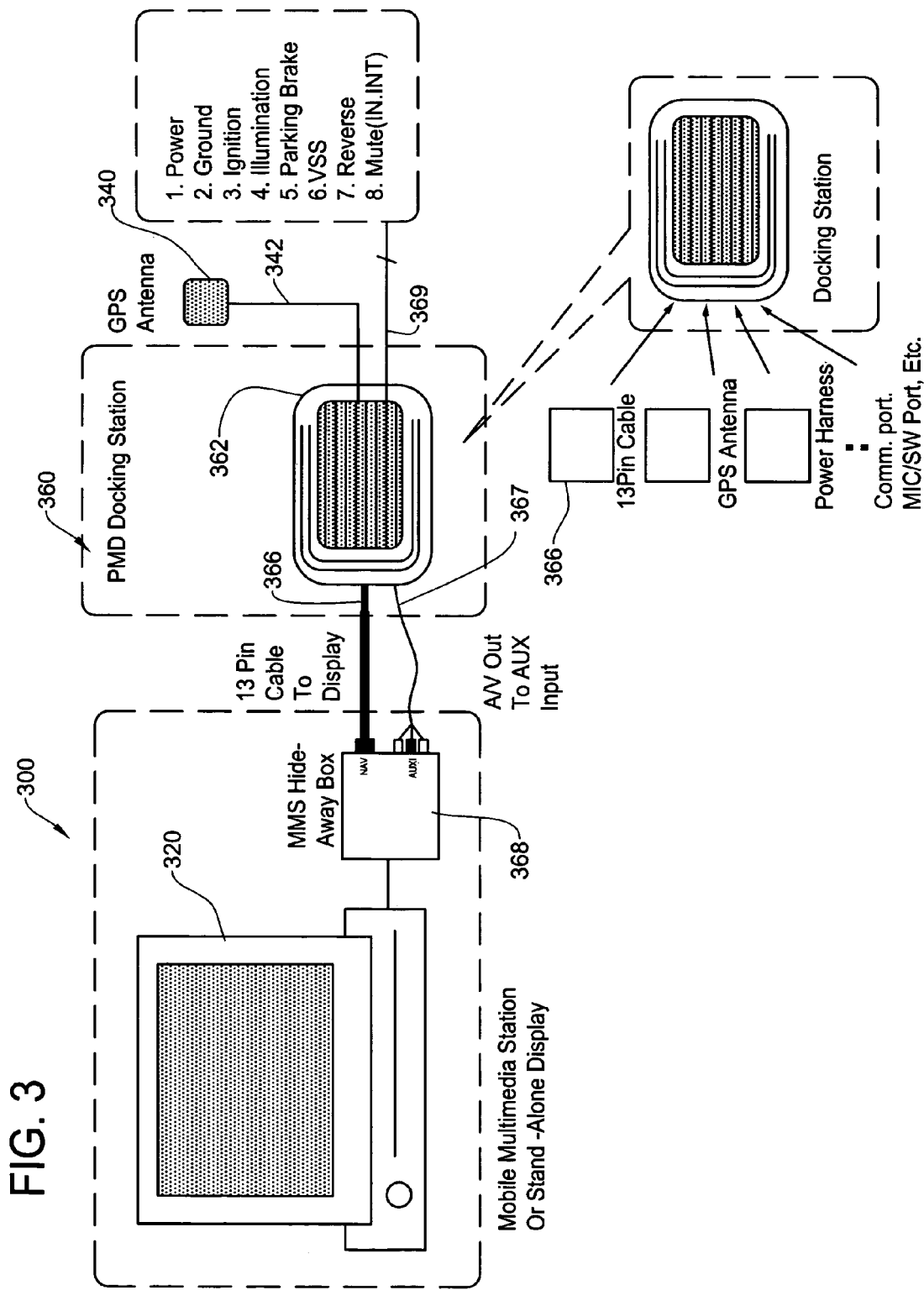
FIG. 3 is a schematic diagram showing a basic concept of the navigation system in accordance with at least one embodiment of the present invention.

In some embodiments, the determination of the display's aspect ratio is done by a signal sent through the interface 160. Such an embodiment is set forth in FIGS. 3 and 4 showing that a cable has a line and pin dedicated to the status of the display aspect ratio. As shown in FIG. 4, pin No. 11 allows for transmission of the status of the display's aspect ratio. In this case, if the display's aspect ratio is 16:9, a high level signal is sent, and if the aspect ratio is 4:3 a low level signal is sent.

Certain embodiments do not include the in-vehicle display 120 of FIGS. 1A and 1B, and instead use the display 182 of the portable navigation unit 180 to show the navigation information. In such embodiments, the portable navigation unit 180 may be preferably positioned in a location different from that shown to better enable the driver to view the display 182.

As shown in FIGS. 1A, 1B and 1G, the in-vehicle controls 125 can function to either control the in-vehicle devices such as a media (information) source 190 and/or to control the operation of the portable navigation unit 180. Using the in-vehicle controls 125 to operate the portable navigation unit 180 instead of the potentially smaller and harder to reach integrated controls 184, it can aid the driver in the operation of the vehicle to reduce the likelihood of driver distraction problems.

Depending on the embodiment, the in-vehicle controls 125 can be physical controls, such as buttons, switches, sliders, etc., and/or virtual controls set forth on a touch sensitive screen or similar display. While the size and positioning of the controls 125 can vary, typically they will be larger than the integrated controls 184 on the portable navigation unit 180 and positioned relatively close to be easily accessible by the driver. The in-vehicle controls 125 can operate the portable navigation unit 180 via a signal transmitted through the interface 160, either by a direct electrical connection or by wireless connection.

In some embodiments, the controls are set in a remote controller (not shown) which transmits a signal to either the in-vehicle portion 110 or directly to the portable navigation unit 180. Certain embodiments can locate the in-vehicle controls 125 in more convenient locations to the driver such as on the steering wheel, or the like. Some embodiments of the navigation system 100 do not include the in-vehicle controls at all.

The in-vehicle speaker 130 can function to transmit or broadcast both sounds generated by in-vehicle devices and sounds generated by the portable navigation unit 180. The sound signals from the portable navigation unit 180 to the in-vehicle portion 110 can be transmitted via the interface 160. The speakers 130 can be one or more speakers of varying size, shape, arrangement, configuration, etc. To improve the quality and/or volume of the sound which the driver hears, in embodiments, the speakers 130 are significantly larger than the integral speaker 185 of the portable navigation unit 180. In addition, the number of speakers 130 can be much greater than that of the portable navigation unit 180. Improving the quality and/or volume of the sound used in navigation can aid the driver's operation of the vehicle and potentially reduce driver distraction. Certain embodiments do not include the in-vehicle speakers 130 and instead utilize the integral speaker 185 as the sole source of sound or have no sound source at all.

The in-vehicle navigation antenna 140 functions to receive navigation signals from external sources. In some embodiments, the antenna 140 is a GPS antenna which receives signals from orbiting GPS satellites. Since the reception of such GPS signals can be adversely affected by obstructions such as the metal bodywork of a vehicle, in some embodiments, the antenna 140 is positioned to have a relatively unobstructed view of the sky. Examples of such positioning can include internal positioning under the front or rear windshield, external positioning on the vehicle's roof or trunk area, or the like.

As noted above, with the integral antenna 186 of the portable navigation unit 180 being positioned within the passenger compartment of the vehicle, improved reception typically will be available from the antenna 140 positioned in the manner noted above. Of course, in certain embodiments the navigation system 100 does not include an in-vehicle antenna 140 and receives the navigation signal from the integral antenna 186 of the portable navigation unit 180.

The in-vehicle data generator 150 functions to provide the navigation system 100 with one or more types of data from the vehicle. The amount and type of data provided can vary by embodiments and can include data which facilitates the navigation functions. For example, the data generator 150 can provide vehicle speed pulse data to be used to determine vehicle speed and distance of travel separately and potentially more accurately than by GPS alone. The data generator 150 can transmit its data to the portable navigation unit 180 via the interface 160.

The interface 160 functions as a connection or data link between the portable navigation unit 180 and the in-vehicle portion 110 of the navigation system 100. As noted above, in some embodiments, the interface 160 can provide two-way communications between the in-vehicle portion 110 and the portable navigation unit 180. Data such as speed pulses, GPS signals, control inputs and the like, can be sent to the portable navigation unit 180 from the in-vehicle portion 110, and data such as the map images, turn indicator images, audio call-outs, and the like can be sent to the in-vehicle portion 110 from the portable navigation unit 180 via the interface 160. It should be noted that the specific types of data transferred between the devices can vary depending on the embodiment of the invention.

Figure 1D:
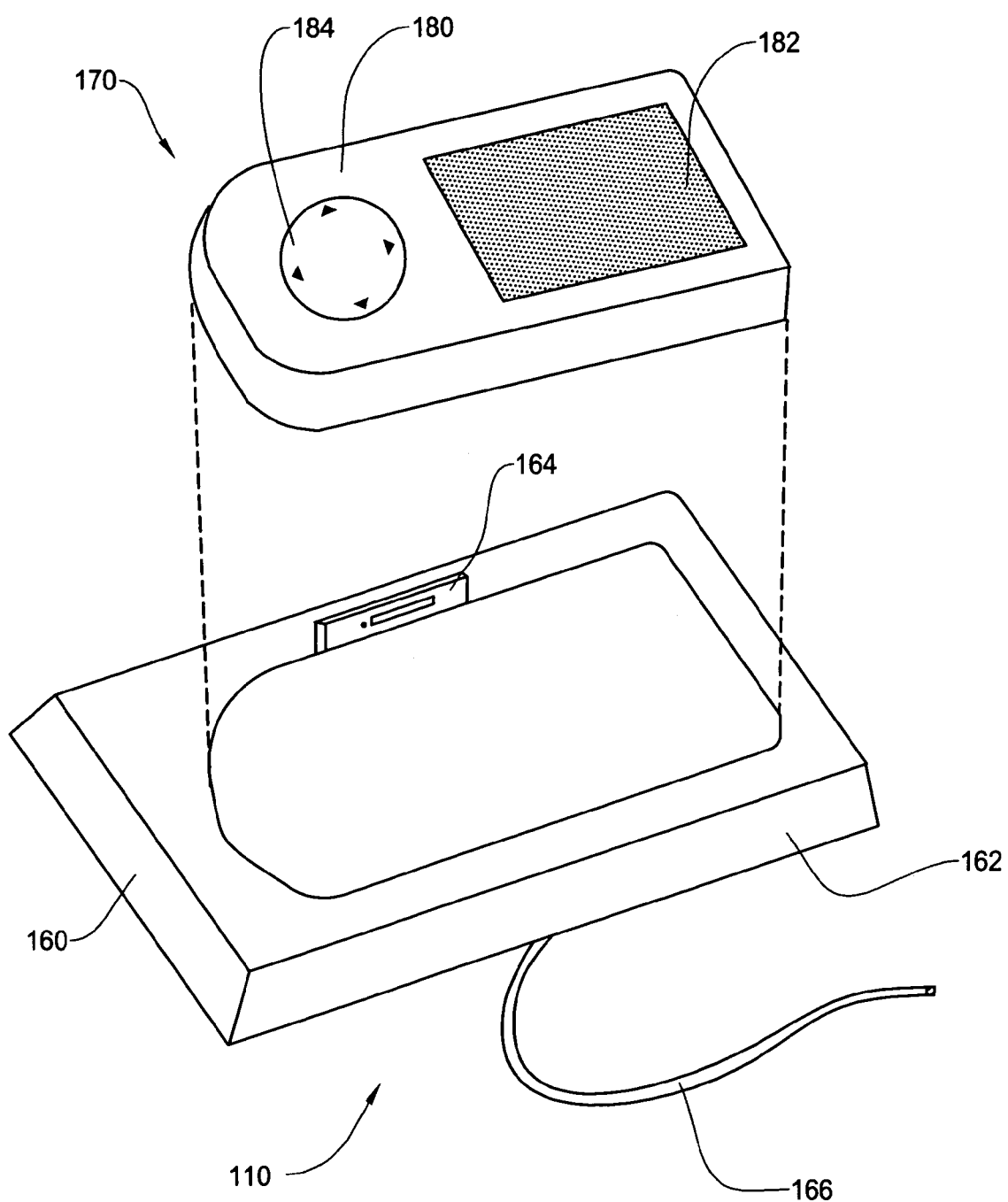
FIG. 1D is a perspective view of a portion of a navigation system including the portable navigation unit and a navigation interface in accordance with at least one embodiment of the present invention.
Figure 1E:
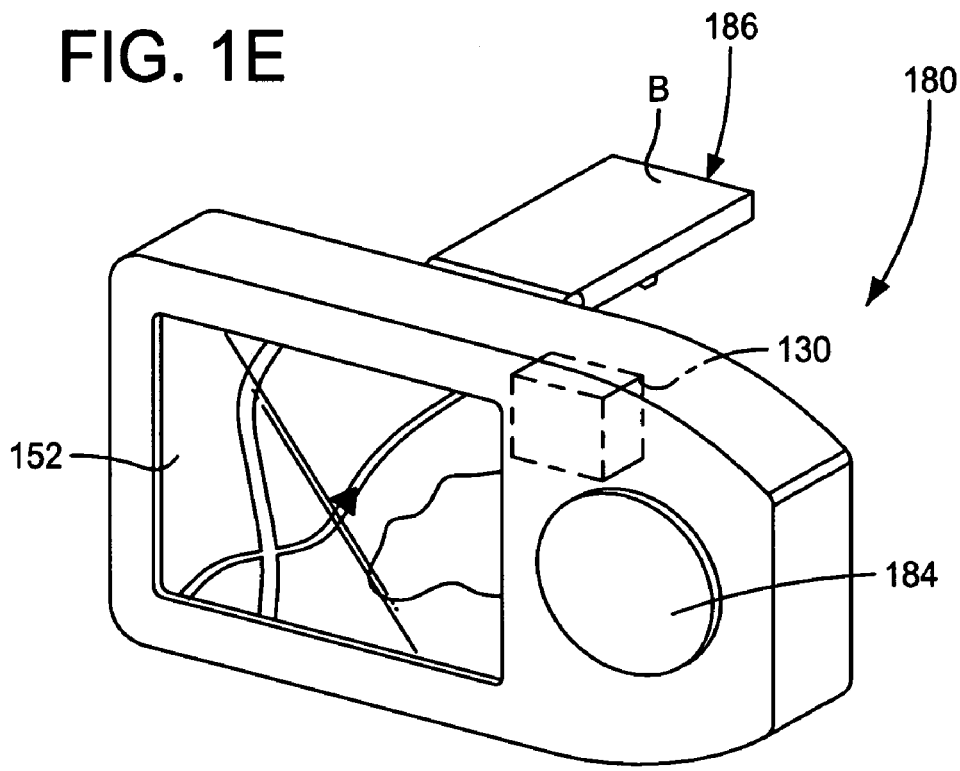
FIG. 1E is a perspective view showing a front portion of the portable navigation unit which is a main component of the navigation system in accordance with at least one embodiment of the present invention.
Figure 1F:
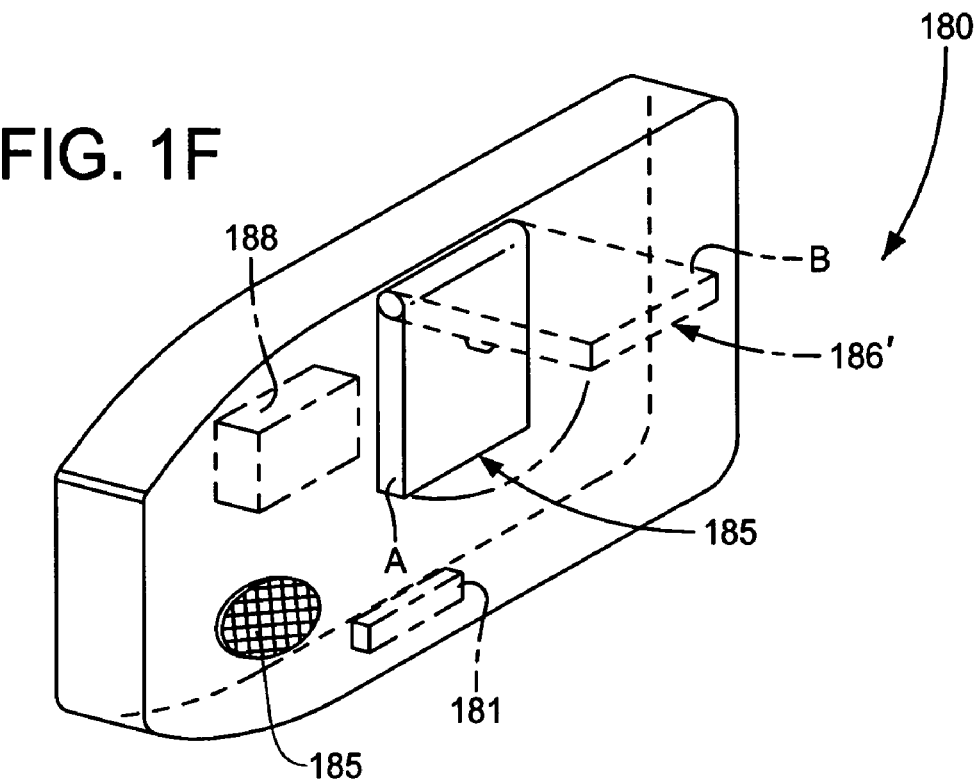
FIG. 1F is a perspective view showing a rear portion of the portable navigation unit which is a main component of the navigation system in accordance with at least one embodiment of the present invention.
Figure 1G:
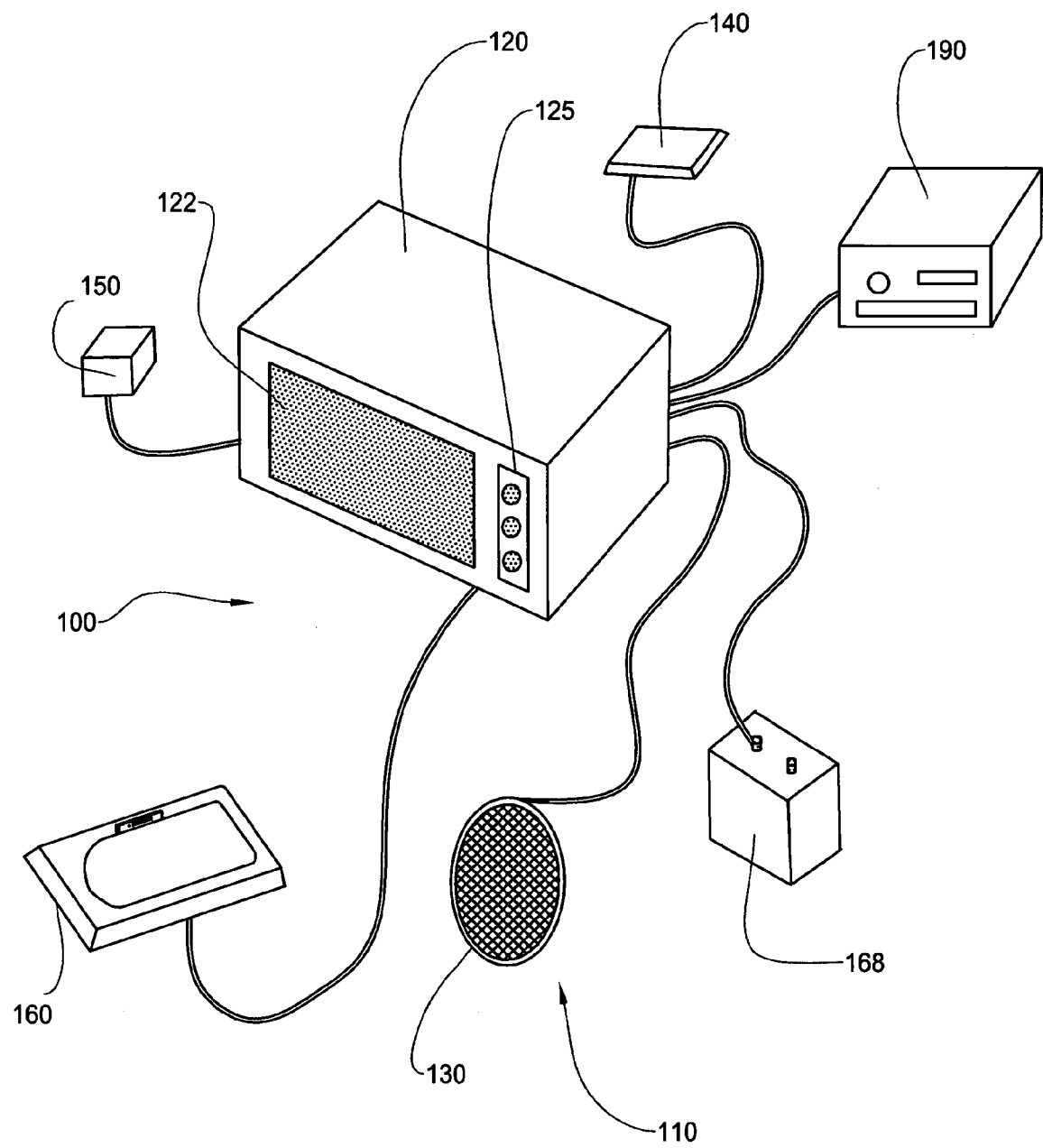
FIG. 1G is a perspective view showing another example of overall structure of the navigation system in accordance with at least one embodiment of the present invention where the portable navigation unit is disconnected.

In at least one embodiment, as shown in FIGS. 1C and 1D, the interface 160 includes a cradle, receptacle, dock or docking station 162 and a cable 166. The cradle 162 functions to receive the portable navigation unit 180 and in so doing make electrical connections between the interface 160 and the portable navigation unit 180. As shown, the cradle 162 also includes a connector 164 which functions to make electrical connections with the connector 181 (FIG. 1F) of the portable navigation unit 180. The connector 164 can be any of a variety of different configurations, including a plug or a receptacle, a USB connector that fits with the connector 181.

The connector 164 on the cradle 162 and the connector 181 (FIG. 1F) of the portable navigation unit 180 can together be any of a variety of cooperating structures, for example an interlocking male-female multi-pin connector. The connector 164 and the connector 181 may be similar to those commonly found on electronic devices such as PDAs, cameras, cell phones and the like. Depending on the embodiment, the particular electrical connections between the connector 164 and the connector 181 can be any of a wide variety. Examples of the connections can include audio, video, power including battery power, AC power for battery charge, audio output, audio mute, illumination inputs, vehicle status inputs, external GPS inputs, car data bus inputs, USB device or other auxiliary or PC device connector, etc.

An embodiment of a navigation system 300 includes a docking station 362 as set forth in FIG. 3, showing the interface 360 including a set or series of connections, including a 13-pin cable 366 connection and an AV Out 367 set between the docking station 362 and a display 320 (via a hide-away box 368), a cable 342 to the in-vehicle GPS antenna 340 and power harness 369. Shown in the table of FIG. 4 is an example of layout and pin assignment of a-13 pin connector with each of its pin and/or lines in the cable identified by pin number, pin name, use, I/O, specification and relevant notes.

Referring back to FIGS. 1A and 1B, in other embodiments, the interface 160 can be a wireless connection between the in-vehicle portion 110 and the portable navigation unit 180. Any known wireless connection can be used including WiFi, Bluetooth, FM transmission, IR (infrared ray) and the like.

The vehicle power source 168 includes a means of delivering power generated by, or otherwise within, the vehicle to each of components of the navigation system 100, including the portable navigation unit 180 through the interface 160. With the power supplied to the portable navigation unit 180 from an external source, the portable navigation unit 180 can prevent or limit any loss of charge of its internal or integral power source 188 (FIGS. 1E and 1F) As noted above, the power source 188 may be a battery, and specifically a rechargeable battery. In addition, the external supply of power can be used to recharge the battery 188 as the portable navigation unit 180 is connected to the in-vehicle portion 110. An example of a power connection cable for a docking station embodiment is set forth in the power harness 369 of FIG. 3.

It should be noted that in some embodiments of the system 100, the portable navigation unit 180 can further include components such as a processor, an image display generator or controller, a database, a memory, a system bus, general purpose inputs (such as for push-button switches, trigger switches, etc.) and outputs (e.g. to trigger illumination lights on the device, sound a buzzer or beeper, etc.), audio outputs, video outputs, wireless information transceiver such as two-way (e.g. cellular, WiFi, Bluetooth, infrared ray, etc.) or one-way (e.g. pager, FM RDS receiver, etc.) communication, and the like.

FIG. 1H is a schematic view showing an example of the components of the navigation system 100. The navigation system 100 is comprised mainly of the in-vehicle portion 110 and the separate removable or portable portion 170. The in-vehicle portion 110 has a plurality of components as described above. The portable portion 170 has the portable navigation unit 180.

FIG. 2 shows at least one embodiment of a navigation system 200. In such embodiments, the arrangement of the connection between components has a difference configuration than that of other embodiments set forth herein. As shown, the navigation system 200 includes an in-vehicle portion 210 and a removable or portable portion 270. The in-vehicle portion includes a display or head unit 220 having a display 222 and controls 225, a speaker or speakers 230, a navigation or GPS antenna 240, a vehicle data source 250, an interface 260 and a power source 268. The removable portion 270 includes a portable navigation unit 280 having a display 282. The interface 260 has an extension from a receptacle (cradle) 261 for the portable navigation unit 280, and a variety of different connections.

The connections can be any of a variety of different items including, for example, electrical cables, optical cables, or the like. As shown, the extension from the receptacle is a display cable 262, an audio/video cable 264, which both connect to the display 220, a GPS cable 265 connecting to the GPS antenna 240, a vehicle data cable 266 connected to the vehicle data generator 250, and a power cable 267 connected to the power source 268. In at least one embodiment, the display cable 262 is a 13-pin cable such as the cable 366 shown in FIG. 3, and the power cable 267 is a power harness, such as that shown as cable 369 shown in FIG. 3. As shown by the embodiments of FIG. 2, the particular arrangement of the connections between components of the navigation system can vary depending on the embodiment. As shown by the embodiments of FIG. 2, the particular arrangement of the connections between components of the navigation system can vary depending on the embodiment.

Figure 5A:
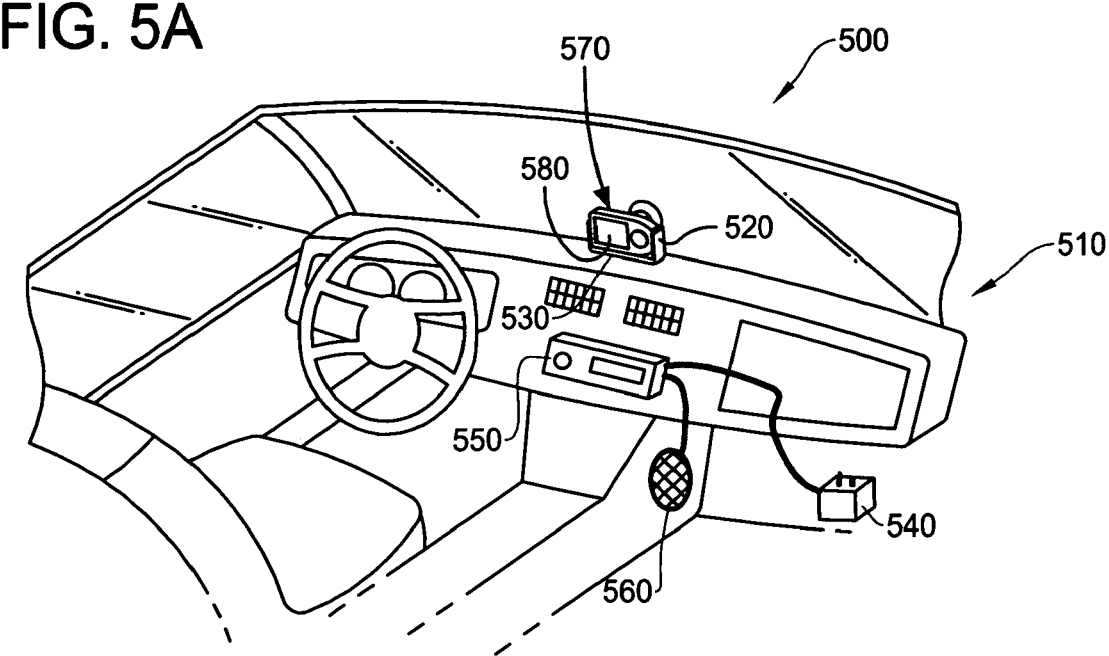
FIG. 5A is a perspective view showing an example of navigation system established within the vehicle by using the portable navigation unit and the in-vehicle components in accordance with at least one embodiment of the present invention.
Figure 5C:
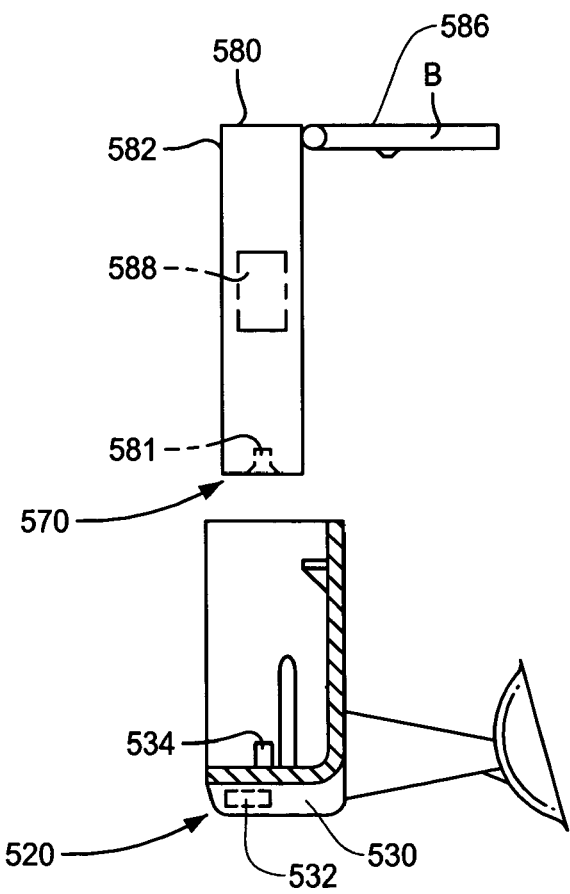
FIG. 5C is a cross sectional side view showing the portable navigation unit and the device mount for the navigation system in accordance with at least one embodiment of the present invention.
Figure 5B:
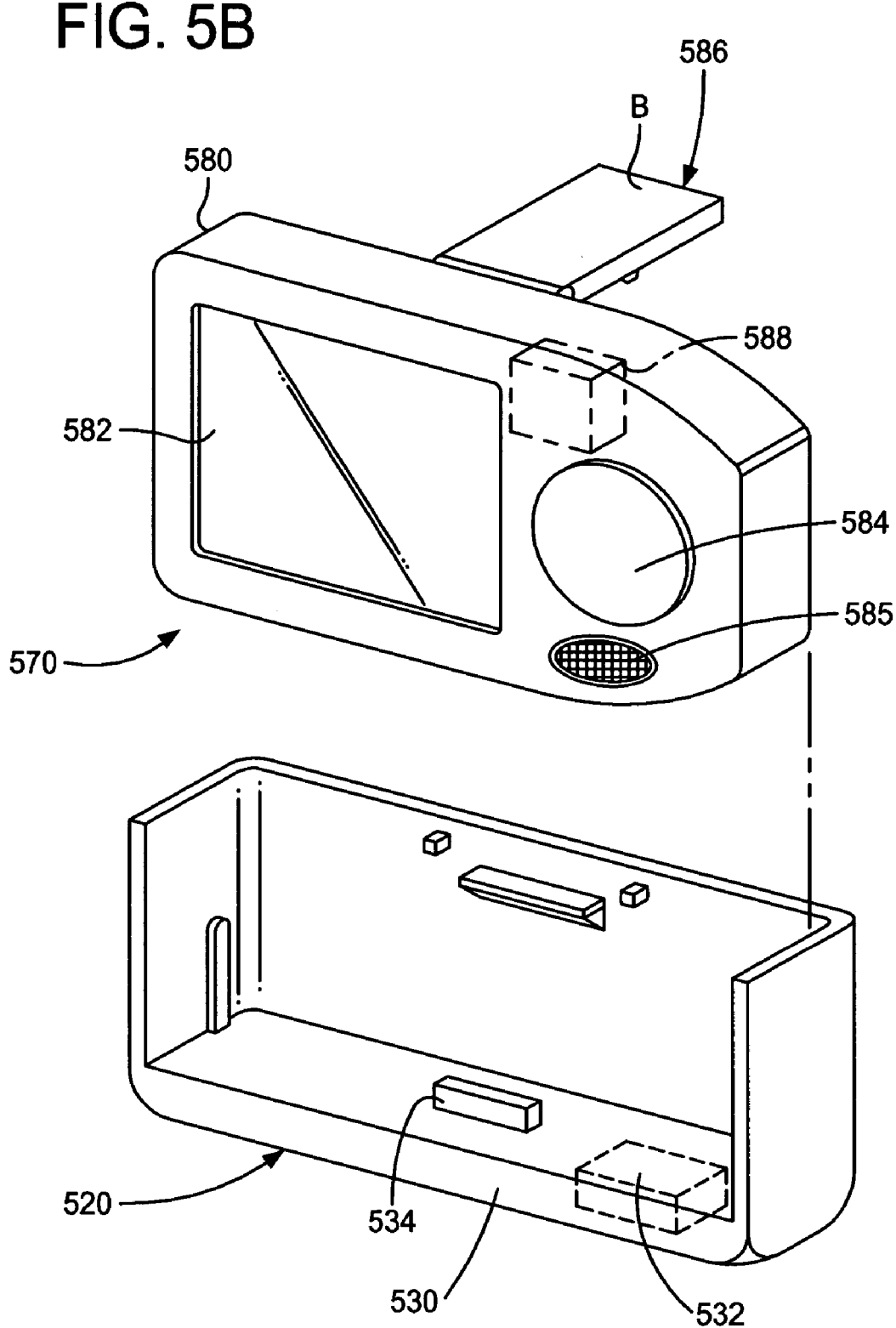
FIG. 5B is a perspective view showing the portable navigation unit and the device mount for the navigation system in accordance with at least one embodiment of the present invention.
Figure 5D:
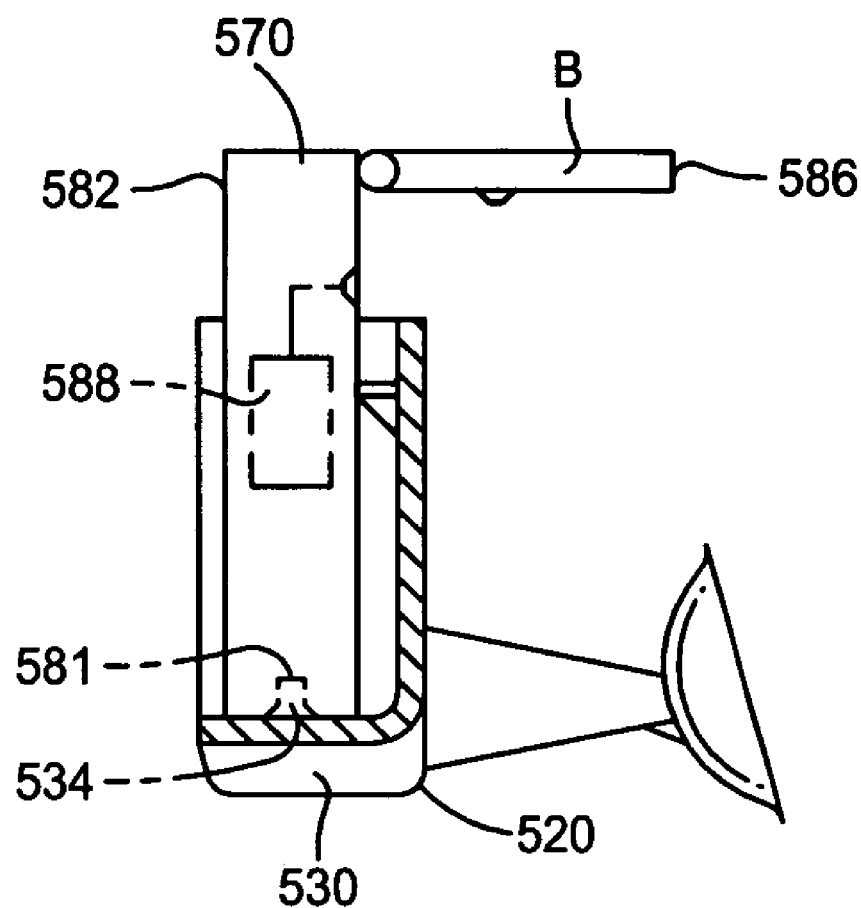
FIG. 5D is a cross-sectional side view of a portion of the navigation system in which the portable navigation unit is inserted in the device mount in accordance with at least one embodiment of the present invention.

As shown in FIGS. 5A-5D, some embodiments of the present invention include a navigation system 500 having an in-vehicle portion 510 and a removal or portable portion 570. The in-vehicle portion 510 includes a cradle or mount 520 for receiving the portable portion 570, an interface 530, a power source 540, a receiver 550 and a speaker or speakers 560. As shown in FIG. 5B, the portable portion 570 includes a portable navigation unit 580 having an interface or connector 581, a display 582, controls 584, a speaker 585, a GPS or navigation antenna 586, and a power source 588.

The size and shape of the cradle 520 can vary for aesthetic and functional advantage. In some embodiments, the size and shape are set to slidably receive and retain the portable navigation unit 580. The cradle 520 can also function to position the portable navigation unit 580 such that the display 582 and the controls 584 are visible and usable by the driver of the vehicle.

In these embodiments, the interface 530 functions to transmit navigational data from the portable navigation unit 580 to the receiver 550 and the speakers 560, including audio call-outs of navigational instructions. The portion of the transmission on the interface 530 from the cradle 520 to the receiver 550 is a wireless transmission. The wireless transmission can be performed by an FM transmitter 532 built into the cradle 520. The FM transmission is received by the receiver 550 when it is tuned to the matching frequency. The FM transmitter 532 may be able to transmit on a choice of different FM frequencies to avoid static or interference. The interface 530 can also include a connector 534 for making direct electrical connections with the portable navigation unit 580. In some embodiments, the connector 534 is similar or the same as the connector 164, as set forth above.

The power source 540 can be used to power the in-vehicle portion 510 and through the interface 530, or similar means, can power the portable navigation unit 580 as well. In such embodiments, the connector 534 can include contacts or pads dedicated to power delivery which are fed by a direct wire connection to the power source 540. With a rechargeable power source 588, the power source 540 can recharge the portable navigation unit 580 while it is connected to the cradle 520. The power source 540 can include the vehicle's power or electrical system.

The receiver 550 is set in the vehicle and functions to receive the transmitted signal from the interface 530 and broadcast it over the speaker 560. In embodiments, the receiver 550 receives the signal through an FM channel, but in other embodiments, the signal can be received via a WiFi, Bluetooth or other similar means. The receiver 550 can be any of a variety of commercially available receivers or radios including aftermarket or OEM installed receivers. The receiver 550 may be powered by the power source 540.

The speakers 560 are also set within the vehicle and are connected to the receiver 550. While the specific size and audio quality of the speakers 560 can vary, to better facilitate the operation of the vehicle, they may be larger and/or of higher quality than the speaker 585 within the portable navigation unit 580.

In some embodiments, the portable navigation unit 580 is similar to the portable navigation unit 180 noted above, as the navigation unit 580 can be removed from the vehicle and used independently. In such an independent use, the portable navigation unit 580 uses its own integrated and/or internal components. Such components can include the connector 581, the display 582, the controls 584, the speaker 585, the navigation antenna 586 and the power source 588.

The connector 581 can be similar to, or the same as, the connector 181 set forth above. The connector 581 functions as an interface with the cradle 520 to allow the transfer of signals and power. Likewise, the display 582 can be similar to, or the same as, the display 182 noted above, operating to show navigation and other images to the user. The controls 584 can also be the same or similar to the controls 184, functioning to allow the user to control the operation of the portable navigation unit 580.

The speaker 585 can, in embodiments, be the same or similar to the speaker 185, being capable of broadcasting the call-outs and other audio sounds generated by the portable navigation unit 580. The navigation antenna 586 can be similar to, or the same as that set forth above for the antenna 186. The power source 588 can, depending on the embodiment, be the same or similar to the power source 188, as it provides a source of electrical power to operate the portable navigation unit 580, when the navigation unit 580 is disconnected and portable.

In some embodiments of the invention, the portable navigation unit and/or the in-vehicle components can also receive and potentially transmit therebetween, traffic, weather, stock, movies, event information or similar information received from an external source. This external source can transmit its data via radio frequencies, such as by a local FM signal, or from orbiting satellites, or the like. Such transmissions can be received by an additional component in either the portable device and/or the in-vehicle portion of the system. Such traffic information can be displayed on either the portable device display and/or the in-vehicle display.

Figure 6:
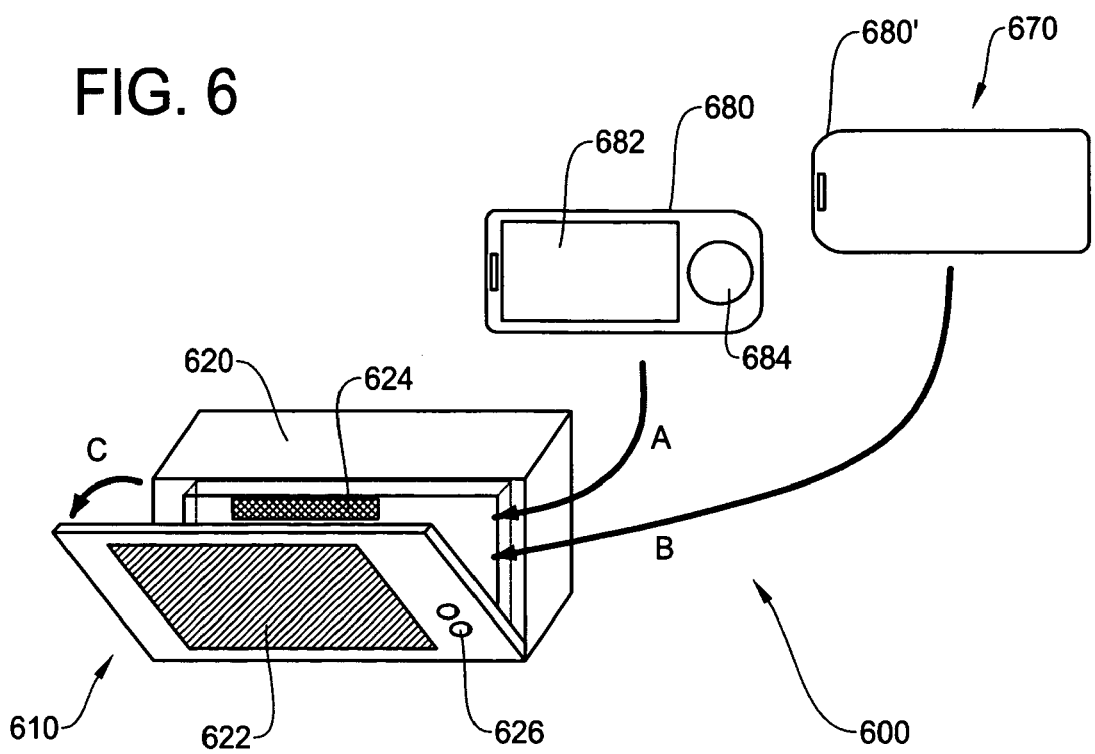
FIG. 6 is a perspective view of a portion of the navigation system including the portable navigation unit and the in-vehicle display in accordance with at least one embodiment of the present invention.

FIG. 6 shows another embodiment of the present invention. The navigation system 600 includes an in-vehicle portion 610 and a removable or portable portion 670. The in-vehicle portion 610 includes a display unit or head unit 620 having a fold down or rotatable display 622, a receptacle 624, and controls 626. The rotatable display 622 is able to open or close as shown by the arrow C in FIG. 6. The portable portion 670 includes a portable navigation unit 680 having a display 682 and controls 684. The backside 680' of the portable navigation unit 680 is also shown in FIG. 6.

The portable navigation unit 680 can be inserted into and received by the receptacle 624, as shown by the arrow A. Likewise, the portable navigation unit 680 can be inserted into and received by the receptacle 624, with the display 682 facing the inside (backward) of the head unit 620, as shown by the arrow B. With the portable navigation unit 680 received in the display unit 620, the system can function as set forth herein for the navigation system 100, 500 and the like noted above. That is, the navigation system 600 differs from the other systems set forth herein in that the portable navigation unit 680 is received by and retained in the display unit 620.

In embodiments, once the portable navigation unit 680 is received by the display unit 620, the navigation images can be displayed on the rotatable display 622 and the portable navigation unit 680 can be operated by the controls 626. Other in-vehicles components, such as speakers, navigation antenna, microphone and the like, can also be used with the display unit 620 although not shown in FIG. 6.

Figure 7:
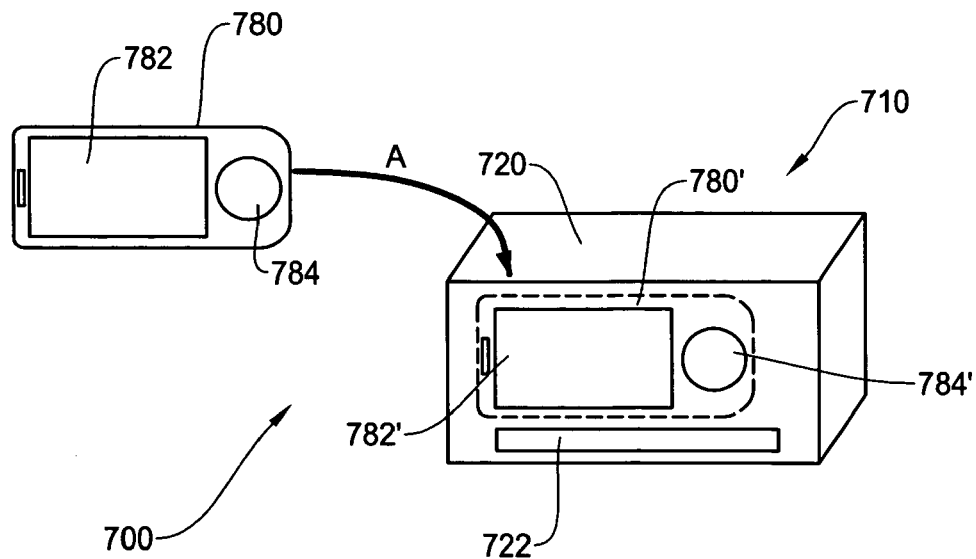
FIG. 7 is a perspective view of a portion of the navigation system including the portable navigation unit and the in-vehicle display in accordance with at least one embodiment of the present invention.

FIG. 7 shows another embodiment of the present invention. The navigation system 700 includes an in-vehicle portion 710 and a removable or portable portion 770. The in-vehicle portion includes a head unit or receiver 720. The portable portion 770 includes a portable navigation unit 780 having a display 782 and controls 784. The in-vehicle portion 710 does not include a display or controls, but instead uses the display 782 and controls 784 of the portable navigation unit 780

As shown, the portable navigation unit 780 can be either separate from the head unit 720 or mounted or attached to the head unit 720 as shown. As indicated by the arrow A, the portable navigation unit 780 is inserted into the receptacle of the head unit 720 so that the display 782 faces outside. In FIG. 7, the portable navigation unit 780', the display 782' and the controller 784' indicate that the portable navigation unit 780 is attached to the head unit 720. Other in-vehicle's components, such as speakers, navigation antenna, microphone and the like, can also be used with the head unit 720.

In another embodiment of the present invention, the portable navigation unit may only include a memory with a database of navigation data and an operating system and/or processor. That is, the portable navigation unit may lack any or all of a display, controls, navigation antenna, power supply, microphone and/or the like. In such embodiments, the in-vehicle portion provides the display, controls, navigation antenna, power supply, microphone and/or the like. Such embodiments provide a variety of advantages including being able to easily remove and replace or update the database, use between more than one vehicle, and/or prevent theft.

FIG. 8 is a schematic block diagram showing the components of the portable (removable) navigation unit 800 and the external (in-vehicle) device 850. The portable navigation unit 800 is equivalent to the portable portion 170 described with reference to FIGS. 1A-1C. The portable navigation unit 800 is comprised of a power source 801 such as an internal battery, a processor 803, a memory 805 that stores information for use by the processor 803, control buttons 809 for input, antenna 813, data 811 such as map data, a display unit 807 for projecting information, a speaker 815, and a connector 817 for connecting to outside sources and devices.

The external device 850, which is typically installed on a vehicle, includes a power source 851, memory 855, control button 859, antenna 863, audio device 869, data 861, processor 853, display unit 857, speaker 865, connector 867, entertainment device 871. The antenna 863 may be a GPS antenna, FM antenna, or the like. The audio device 869 includes such devices as CD player, MP3 player, FM tuner, etc. The entertainment device 871 includes a DVD player or the like. The connector 817 and the connector 867 function as an interface between the portable navigation unit 800 and the external device 850 to offer seamless integration of the portable navigation unit 800 to the external device 850. As described above, the connection between the portable navigation unit 800 and the external device 850 may be established by wireless communication.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation system for displaying a map image for guiding a user to a destination, comprising:
   an in-vehicle portion provided within a vehicle, the in-vehicle portion at least including a navigation interface and a power source; and
   a removable navigational unit at least including a map database and a processor for processing map data from the map database;
   wherein the removable navigation unit is connected to the in-vehicle portion such that the removable navigational unit operates in combination with the in-vehicle portion to perform navigation functions that are improved than that performed by the removable navigation unit alone, and wherein the removable navigation unit includes an integral display and the in-vehicle portion includes an in-vehicle display, and when mounted on the navigation interface, the removable navigation unit disables the integral display and activates the in-vehicle display to use only the in-vehicle display for performing the navigation functions.

2. A navigation system as defined in claim 1, wherein the navigation interface in the in-vehicle portion establishes communication between the removable navigation unit and the in-vehicle portion when the removable navigation unit is mounted on the navigation interface where the interface includes a connector to transmits electrical signals and power between the removable navigation unit and the in-vehicle portion.

3. A navigation system as defined in claim 2, wherein the removable navigation unit includes an internal power source, and when mounted on the navigation interface, the removable navigation unit switches the internal power source to use the power source in the in-vehicle portion for performing the navigation functions; and wherein the removable navigation unit charges the internal power source by the power source of the in-vehicle portion.

4. A navigation system as defined in claim 2, wherein when mounted on the navigation interface, the removable navigation unit activates both the integral display and the in-vehicle display for performing the navigation functions.

5. A navigation system as defined in claim 2, wherein the removable navigation unit includes an integral speaker and the in-vehicle portion includes an in-vehicle speaker, and when mounted on the navigation interface, the removable navigation unit disables the integral speaker and activates the in-vehicle display to use only the in-vehicle speaker for performing the navigation functions.

6. A navigation system as defined in claim 5, wherein the removable navigation unit controls relative volume of sounds that are reproduced by the in-vehicle speaker such that the volume of navigational sounds is greater than that of non-navigational sounds.

7. A navigation system as defined in claim 2, wherein the removable navigation unit includes an integral antenna and the in-vehicle portion includes an in-vehicle antenna, and when mounted on the navigation interface, the removable navigation unit disables the integral antenna and activates the in-vehicle antenna to use only the in-vehicle antenna for performing the navigation functions.

8. A navigation system as defined in claim 2, wherein the removable navigation unit includes an integral antenna and the in-vehicle portion includes an in-vehicle antenna, and when mounted on the navigation interface, the removable navigation unit activates both the integral antenna and the in-vehicle antenna for performing the navigation functions.

9. A navigation system as defined in claim 2, wherein the removable navigation unit includes integral controls and the in-vehicle portion includes in-vehicle controls, and when mounted on the navigation interface, the removable navigation unit disables the integral controls and activates the in-vehicle controls to use only the in-vehicle controls for performing the navigation functions.

10. A navigation system as defined in claim 2, wherein the removable navigation unit includes integral controls and the in-vehicle portion includes in-vehicle controls, and when mounted on the navigation interface, the removable navigation unit activates both the integral controls and the in-vehicle controls for performing the navigation functions.

11. A navigation system as defined in claim 1, wherein the removable navigation unit further includes integral controls, an integral navigation antenna, and an integral power source, thereby performing the navigation functions independently from the in-vehicle portion.

12. A navigation system as defined in claim 1, wherein the in-vehicle portion further includes in-vehicle controls, an in-vehicle antenna, an in-vehicle information source including map data, and an in-vehicle data generator including vehicle speed pulses, thereby performing the navigation functions independently from the portable navigation unit.

13. A navigation system as defined in claim 1, wherein the navigation interface in the in-vehicle portion is a docking station or cradle that receives the removable navigation unit, the docking station having an electrical connector to establish electric connection between the in-vehicle portion and the removable navigation unit.

14. A navigation system as defined in claim 13, wherein, when the removable navigation unit is mounted on the navigation interface, the navigation interface sends signals and data to components in the in-vehicle portion and receives signals and data from the components in the in-vehicle portion through wired communication.

15. A navigation system as defined in claim 13, wherein, when the removable navigation unit is mounted on the navigation interface, the navigation interface sends signals and data to components in the in-vehicle portion and receives signals and data from the components in the in-vehicle portion through wireless communication.

16. A navigation system as defined in claim 1, wherein the in-vehicle portion includes an in-vehicle display unit having a receptacle therein so that the removable navigation unit is connected with the receptacle within the in-vehicle display unit, thereby displaying images involving the navigation function by the in-vehicle display unit.

17. A navigation system as defined in claim 1, wherein the in-vehicle portion has a display receptacle that receives the display of the removable navigation unit such that the integral display faces a driver for viewing.

* * * * *